United States Patent [19]
Chattha et al.

[11] Patent Number: 5,922,295
[45] Date of Patent: Jul. 13, 1999

[54] SULFUR-RESISTANT $NO_X$ TRAPS CONTAINING TUNGSTOPHOSPHORIC ACID AND PRECIOUS METAL

[75] Inventors: Mohinder S. Chattha, Northville; Tjenga E. Hoost, Redford; Robert J. Kudla, Warren, all of Mich.

[73] Assignee: Ford Global Technologies, Inc., Dearborn, Mich.

[21] Appl. No.: 08/814,523

[22] Filed: Mar. 10, 1997

[51] Int. Cl.$^6$ ............................... B01J 8/02; B01D 53/34
[52] U.S. Cl. ..................... 423/213.7; 423/213.2; 423/213.5; 423/239.1; 423/235; 422/177; 422/171; 60/274; 60/297; 502/208; 502/210; 502/213; 502/305; 502/313
[58] Field of Search ..................... 422/168, 171, 422/177, 178, 180, 211, 222; 423/213.5, 239.1, 235, 213.7; 60/274, 297, 299, 301; 502/208, 210, 213, 305, 313

[56] References Cited

U.S. PATENT DOCUMENTS

| | | | |
|---|---|---|---|
| 4,389,382 | 6/1983 | Gandhi et al. | 423/213.5 |
| 4,874,852 | 10/1989 | Kinomura et al. | 502/209 |
| 5,391,532 | 2/1995 | Soled et al. | 502/210 |
| 5,399,324 | 3/1995 | Subramanian et al. | 423/213.7 |

FOREIGN PATENT DOCUMENTS

0613714A2 9/1994 European Pat. Off. .

OTHER PUBLICATIONS

N. Chen and R. T. Yang, "Activation of Nitric Oxice by Heteropoly Compounds: Structure of Nitric Oxide Linkages in Tungstophosphoric Acid with Keggin Units," 1995, pp. 76–86, Journal of Catalysis 157.

N. Chen and R. T. Yang, "A New Approach to Decomposition of Nitric Oxide Using Sorbent/Catalyst without Reducing Gas: Use of Heteropoly Compounds," 1994, pp. 825–831, Ind. Eng. Chem. Res.

Raymond Belanger and John B. Moffat, "Removal of $No_2$ from Gaseous Streams by Sorption and Conversion on 12–Tungstophosphoric Acid," 1995, pp. 1681–1685, Environ. Sci. Technol. vol. 29.

Raymond Belanger and John B. Moffat, "A Comparative Study of the Adsorption and Reaction of Nitrogen Oxides on 12–Tungstophosphoric, 12–Tungstosilicic, and 12–Molybdophosphoric Acids," 1995, pp. 179–188, Journal of Catlysis 152.

*Primary Examiner*—Hien Tran
*Attorney, Agent, or Firm*—Lorraine S. Melotik

[57] ABSTRACT

The invention is a nitrogen oxide trap comprising a porous support of alumina; and loaded thereon materials consisting essentially of particular amounts of: (I) tungstophosphoric acid and (II) precious metal selected from platinum, palladium, rhodium and mixtures thereof. The trap is useful for trapping nitrogen oxides produced in the exhaust gas generated by an internal combustion gasoline engine during lean-burn operation of the engine. The trap releases the nitrogen oxides during decreased oxygen concentration in the exhaust gas. The desorbed NOx may be converted over the precious metal to $N_2$ and $O_2$ by reductants like hydrocarbons present in the exhaust gas.

14 Claims, 2 Drawing Sheets

SULFUR-RESISTANT NO$_X$ TRAPS CONTAINING TUNGSTOPHOSPHORIC ACID AND PRECIOUS METAL

Reference is made to concurrently filed related U.S. patent application Ser. No. 08/814,524 based on Invention Disclosure 96-1025 entitled "Sulfur-Resistant Lean-NOx Catalyst for Treating Diesel Emissions".

FIELD OF THE INVENTION

This invention relates to a nitrogen oxide trap employed in the exhaust gas passage system of a gasoline internal combustion engine to absorb nitrogen oxides during lean-burn operation and release the nitrogen oxides when the oxygen concentration in the exhaust gas is lowered. In particular, the trap comprises precious metal and tungstophosphoric acid loaded on a support.

BACKGROUND OF THE INVENTION

Catalysts are employed in the exhaust systems of automotive vehicles to convert carbon monoxide, hydrocarbons, and nitrogen oxides (NOx) produced during engine operation into more desirable gases. When the engine is operated in a stoichiometric or slightly rich air/fuel ratio, i.e., between about 14.7 and 14.4, catalysts containing precious metals like palladium and rhodium are able to efficiently convert all three gases simultaneously. Hence, such catalysts are often called "three-way" catalysts.

It is desirable, however, to operate gasoline engines under "lean-burn" conditions where the A/F ratio is greater than 14.7, generally between 19 and 27, to realize a benefit in fuel economy. Such three-way catalysts are able to convert carbon monoxide and hydrocarbons but are not efficient in the reduction of NOx during lean-burn (excess oxygen) operation. Efforts have been made in developing lean-burn catalysts in recent years. One deficiency of some of the conventional lean-burn catalysts is that they are based on zeolite materials which are less than durable at the elevated temperatures necessary for their efficient catalytic operation in the exhaust gas system. Recent efforts to solve the problem of NOx in lean-burn systems have focused on lean-NOx traps, i.e., materials which are able to absorb nitrogen oxides during lean-burn operation and then later release them when the oxygen concentration in the exhaust gas is reduced. Typical of material combinations in conventional traps are an alkaline earth metal like barium with a precious metal catalyst like platinum. European Patent Application 0613714A2 published Sep. 7th, 1994 discloses that platinum or palladium in various combinations with at least two ingredient materials of the alkali metals, alkaline earth metals, transition metals, or rare-earth metal are capable of storing or absorbing nitrogen oxides under exhaust conditions of excess oxygen.

The widely held mechanism for this absorption phenomena is that during the lean-burn operation the platinum first oxidizes NO to $NO_2$ and the $NO_2$ subsequently forms a nitrate complex with the other material, e.g., the barium. In the regeneration mode as during a stoichiometric or rich environment, the nitrate is thermodynamically unstable, and the stored NOx is released. NOx then catalytically reacts over the platinum with reducing species in the exhaust gas to form $O_2$ and $N_2$. Hence to use lean-NOx traps, a hybrid-mode engine strategy is used. The air/fuel ratio is cycled between extended periods of lean operations where the traps sorb NOx emissions, alternated with brief, fuel-richer intervals to desorb the adsorbed NOx and regenerate the lean-NOx trap.

The alkali metal and alkaline earth metals which are typically utilized for NOx sorption have, however, the serious drawback that they are readily poisoned by sulfur in the exhaust gas. Most fuels for automotive vehicles contain sulfur and when burnt, the sulfur is converted to sulfur compounds like $SO_2$. Over time, the sulfur compounds react with these trap materials forming sulfates which will not revert back to the sorption material. These sulfates are inactive for NOx sorption. As a result, the typical NOx trap is strongly deactivated by sulfur in the fuel. We have unexpectedly found that by forming a lean-NOx trap using tungstophosphoric acid and platinum the sulfur poisoning deficiency of prior art NOx traps is significantly eliminated.

Some properties of 12-tungstophosphoric acid are discussed in the article "Activation of Nitric Oxide by Heteropoly Compounds: Structure of Nitric Oxide Linkages in Tungstophosphoric Acid with Keggin Units", N. Chen and R. T. Yang, Journal of Catalysis 157, 76–86 (1995). This article discloses that a tungstophosphoric acid sample adsorbs NO from a flue gas at relatively low temperatures and, upon rapid heating of the sample, a fraction of the NO is decomposed to $N_2$. The present invention NOx trap comprises a precious metal along with tungstophosphoric acid to absorb NOx from gasoline engine exhaust gas during lean-burn operation, desorption taking place when the oxygen concentration is lowered. And the trap relies on reductants, e.g., hydrocarbons, present in the vehicle exhaust for the catalytic reduction of the desorbed NOx. We have found that this invention trap overcomes the deficiencies of prior art NOx traps in that it has excellent NOx trapping ability while being resistant to sulfur poisoning.

DISCLOSURE OF THE INVENTION

This invention is directed to a nitrogen oxide trap useful to absorb nitrogen oxides produced in exhaust gases of a gasoline internal combustion engine during lean-burn operation and then release the absorbed nitrogen oxides when the oxygen concentration of the exhaust gas is lowered. The NOx trap comprises a porous support comprising alumina; and materials loaded on said support. The materials consist essentially of: (i) 5 to 40 weight percent 12-tungstophosphoric acid and (ii) at least 0.25 weight percent precious metal selected from the group consisting of platinum, rhodium, palladium, and mixtures of any of them, each amount of materials (i) and (ii) being individually based on the weight of the porous alumina support. Preferably the support material is gamma-alumina, the precious metal is only platinum, and the tungstophosphoric acid and platinum are loaded on the support as a mixture.

In another aspect, the invention is an exhaust gas treatment system of a gasoline internal combustion engine, the system comprising the disclosed trap located in an exhaust gas passage of the engine, e.g., of an automotive vehicle. The NOx trap device absorbs NOx when the air/fuel ratio of exhaust gas flowing into the trap device is lean (of stoichiometric) and releases the absorbed NOx when the oxygen concentration in the exhaust gas is lowered, as during stoichiometric or rich operation of the engine, during which time the desorbed NOx is converted to nitrogen and oxygen. According to another aspect, the invention is a process for absorbing nitrogen oxides generated by an internal combustion engine using the disclosed NOx trap.

Advantageously, we have found that by using the combination of the precious metal and tungstophosphoric acid materials, the NOx conversion efficiency of the materials is maintained even in the presence of sulfur in the exhaust gas.

We have found this to be based on the resistance of the invention trap materials to forming sulfates, in contrast to conventional absorbents like barium which are readily poisoned by sulfur. This allows for improved operation of the present trap as compared to the prior conventional traps because the active acidic sites of the acid specifically adsorb NOx but not the detrimental sulfur dioxide poison.

In contrast to conventional traps employing, for example barium, we believe that the present invention lean-NOx trap absorbs the nitrogen oxides without converting them to nitrates first. That is, the tungstophosphoric acid absorbs the nitrogen oxide as present at the acidic sites of the acid. Hence, it is not necessary for the precious metal to first convert the nitrogen oxide to $NO_3^-$ as with conventional NOx traps in order to facilitate absorption of the nitrogen oxides.

DESCRIPTION OF PREFERRED EMBODIMENTS

Figure 1:
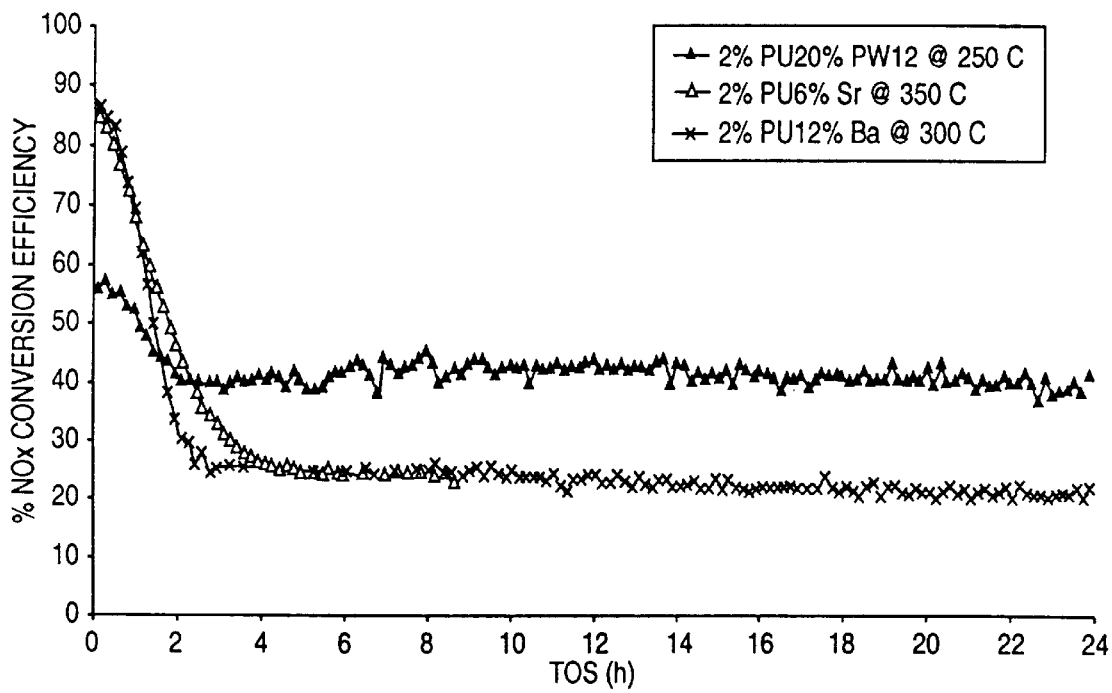
FIG. 1 is a graph showing the effect of sulfur poisoning on nitrogen oxide conversion efficiency of three lean-NOx traps, one being according to an embodiment of the present invention (open triangles) and the other two being comparative examples using conventional platinum/strontium (solid triangles) and platinum/barium formulations (crosses). All are shown at their temperature of optimal initial NOx conversion efficiency.

This invention is directed to a NOx trap useful in the exhaust gas system of a lean-burn gasoline engine. This NOx trap comprises: a porous support comprising alumina and loaded thereon materials consisting essentially of: (i) 5 to 40 weight percent tungstophosphoric acid and (ii) at least 0.25 weight percent precious metal selected from the group consisting of platinum, rhodium, palladium, and a mixture of any of them, each amount of materials (i) and (ii) being individually based on the weight of the alumina support.

Preferably the tungstophosphoric acid is loaded on the support in an amount of 10 to 25 weight percent, more preferably being about 20 weight percent. The precious metal is preferably loaded on the support in an amount of 0.5 to 5, most preferably 0.5 to 3 weight percent. Most optimally, the precious metal is loaded in about 2 weight percent and while it is most preferable to use only platinum as the precious metal, a mixture of platinum, rhodium, and palladium may be used. When a mixture of platinum and rhodium is used, the weight ratio of platinum: rhodium is up to about 50:1. It is most desirable to use only platinum because of the cost of the other precious metals, however, including rhodium is desirable because the efficiency in conversion of the desorbed nitrogen oxides is increased.

In manufacturing the trap, either the tungstophosphoric acid or the precious metal may be loaded one onto the other on the support, or they may be loaded in admixture on the support. Preferably the latter has been found to give the best results for sustained NOx absorption activity.

The porous support (washcoat) material loaded with the catalysts is a high surface area washcoat material of alumina, preferably being mostly (i.e., greater than 50%) gamma-alumina. The alumina support material, however, may comprise other materials like cerium oxide, zirconium oxide, lanthanum oxide, titanium oxide, silica, and alumina like alpha-alumina. These materials, which may act as stabilizers, may be provided in the support material or as a layer thereon. The mostly gamma-alumina support is preferred because it has high surface area, good adhesion and low chemical interaction with the catalyst materials. The choice of the particular alumina composition is not critical to this invention. Desirably, the alumina support material has a surface area between about 5 and 300 $m^2/g$.

For useful application as a NOx trap in an exhaust gas system of for example gasoline or diesel engines, the washcoat will be carried on a substrate of a high temperature stable, electrically insulating material. Typical of such substrate materials are cordierite, mullite, etc. The substrate may be in any suitable configuration, often being employed as a monolithic honeycomb structure, spun fibers, corrugated foils or layered materials. The preferred mechanical carrier is comprised of a monolithic magnesium aluminum silicate structure (i.e., cordierite), although the configuration of the structure is not critical. It is preferred that the substrate provide 50–1000 meter square per liter structure, as measured by nitrogen adsorption. Cell density should be maximized consistent with pressure drop limitations and is preferably in the range of 200–800 cells per square inch of cross-sectional area of the structure. Still other materials and configurations useful in this invention and suitable in an exhaust gas system will be apparent to those skilled in the art in view of the present disclosure.

The washcoat (support), precious metal catalyst, and tungstophosphoric acid may be applied to the substrate as a mixture of washcoat and these materials or in sequential steps, the washcoat being applied first, in a manner which would be readily apparent to those skilled in the art of catalyst manufacture. Preferably, the washcoat is first applied to the substrate followed by drying and calcination of the washcoat. Then the precious metal and tungstophosphoric acid materials can be deposited on the washcoat, as by impregnation techniques well known to those skilled in the art. According to such techniques, tungstophosphoric acid and a soluble salt of precious metal, individually or together, would be dissolved in an aqueous or organic solvent to form a solution which is then impregnated into the washcoat. If impregnated into the support individually, the order is not critical. Preferably, however, the precious metal and acid materials are dissolved together in a solvent to form a common solution which is then impregnated into the porous support in a single step. Additionally, we have found that for traps where the platinum and tungstophosphoric acid are applied as two coatings, better NOx conversion efficiency is achieved when the sample is not calcined between coatings.

Tungstophosphoric acid employed in the present invention, more specifically chemically referred to as 12-tungstophosphoric acid, is commercially available as, for example, from Acros Organics, New Jersey, USA. The 12-tungstophosphoric acid is available in solid form which is readily soluble in water and organic solvents like isobutanol. The particular precursor employed to deposit the precious metal as well as the solvent used to dissolve the precious metal precursor is not critical to this invention. Exemplary platinum containing compounds include chloroplatinic acid and tetramine platinum nitrate. For rhodium, solulizable precursors include rhodium nitrate and rhodium chloride. Solvents which may be useful include water and methanol water being preferred. Other such materials which may be used would be apparent to those skilled in the art in view of the present disclosure. In the case of platinum, in air at elevated temperatures it is oxidized to platinum oxide which at still higher temperatures decomposes to platinum and oxygen. Thus it often exists on the support as a mixture of platinum and its oxides.

Figure 2:
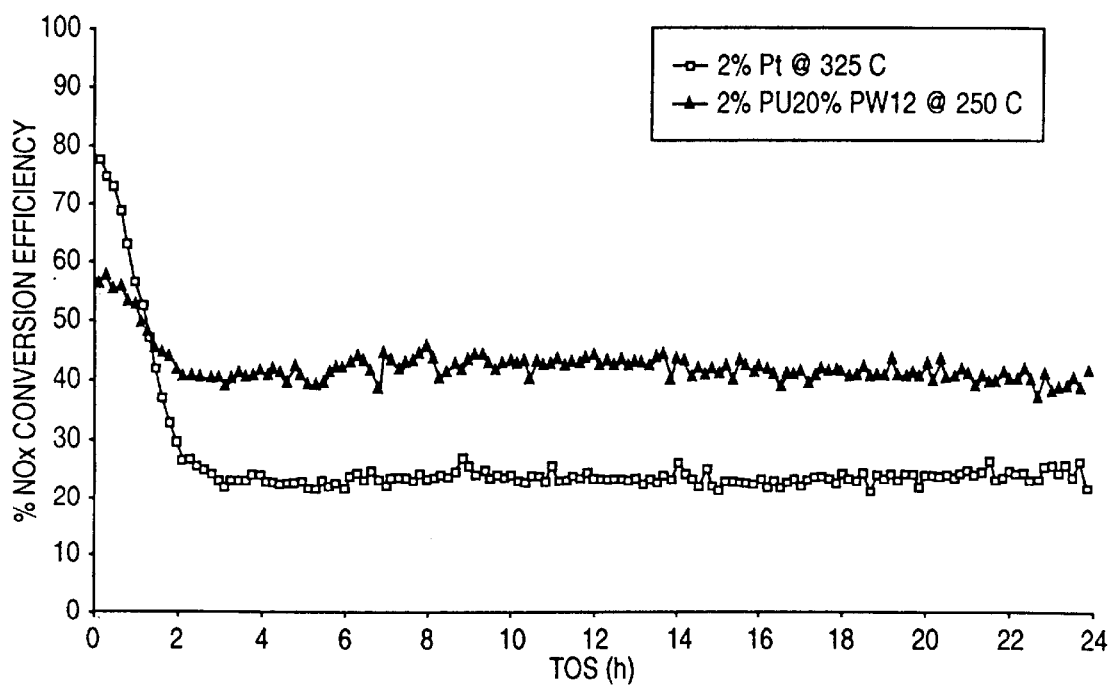
FIG. 2 is a graph showing a comparison of NOx conversion efficiency of a comparative platinum only (open squares) formulation with a lean-NOx trap formulation according to an embodiment of the present invention (open triangles). Both are shown at their temperature of maximum initial NOx conversion efficiency.

As discussed above it is well known in the art that conventional NOx traps using barium or potassium as the NOx absorbent are susceptible to poisoning by sulfur compounds present in the exhaust gases. We have found that by using the combination of tungstophosphoric acid with the precious metal in the loadings disclosed, this problem is overcome significantly. That is, the NOx trapping efficiency of the NOx trap device is maintained as shown in FIGS. 1 and 2.

As disclosed above, according to another aspect of the invention, it comprises an exhaust gas treatment system comprising the NOx trap disclosed herein disposed in the exhaust gas passage of a gasoline internal combustion engines. The exhaust gas treatment system of this invention may include another catalyst device as, for example, a catalytic converter employing a conventional three-way catalyst containing palladium, etc., or a lean-burn catalyst such as one containing transition metals like silver, copper, etc. These catalysts, e.g., the three-way catalyst, can be placed upstream of the NOx trap, hence closer to the engine. In such an arrangement, the three-way catalyst being preferably closely mounted to the engine would warm up quickly and provide for efficient engine cold start emission control. The NOx trap would be positioned downstream of the three-way catalyst where the lower exhaust gas temperature enables maximum NOx trap efficiency. Also, with the NOx trap positioned downstream of the three-way catalyst in a remote location, it is protected against very high exhaust gas temperatures which could damage it. During periods of lean-burn engine operation when NOx passes through the three-way catalyst, NOx is stored on the tungstophosphoric acid of the trap. The NOx trap is periodically regenerated by short periods or intervals of slightly rich engine operation. Thus, the stored NOx is then released from the tungstophosphoric acid trapping material and is catalytically reduced over the precious metal like platinum in the trap by the excess hydrocarbons and other reductants like CO and $H_2$ present in the exhaust gas. In general, the released NOx is efficiently converted to $N_2$ and $O_2$, which efficiency is enhanced when rhodium is contained within the NOx trap washcoat. However, one may wish to place a second three way catalyst downstream of the NOx trap in order to further aid in this regard. As disclosed above, the invention NOx trap is to be used for gasoline engines, particularly lean-burn gasoline engines where the air/fuel ratio is usually in the range 19–27.

EXAMPLE 1

A nitrogen oxide trap according to an embodiment of the present invention containing tungstophosphoric acid/ platinum is prepared as follows. A cordierite monolith (400 cpsi) weighing 581.5 g and having a 33 wt % loading of alumina washcoat is obtained from Johnson Matthey. The alumina is gamma-alumina and provided on the cordierite from an aqueous slurry of the alumina which is dried and calcined. The alumina coated monolith is first impregnated with an aqueous solution containing dissolved 12-tungstophosphoric acid ($PW_{12}$). The solution is prepared by dissolving 48.0 g of 12-tungstophosphoric acid obtained from Acros Organics in 440 ml of deionized water. The alumina coated monolith is dipped in the solution until saturation. Excess liquid in the channels is removed using a blower. The monolith is then dried in a furnace at 45° C. Subsequently, dipping and drying are repeated until all of the acid solution is sorbed. For the second coating, 85.1 ml of an aqueous solution of hydrochloroplatinic acid (0.046 g Pt/ml) is used. Dipping and drying is as mentioned above, except that the final drying step is at 100° C. The resulting trap monolith contains coatings of 2 wt. % Pt and 20 wt. % tungstophosphoric acid, where the percentages are with respect to the alumina washcoat.

Equivalently, the amounts of tungstophosphoric acid and hydrochloroplatinic acid can be dissolved in a common solution and applied to the catalyst in a single, co-impregnation coating.

EXAMPLE 2

(Comparative Strontium/Platinum Trap)

An alumina coated monolith weighing 356.9 g and wash-coated with 33 wt. % alumina as in Example 1 is coated with a solution of strontium nitrate (10.33 g dissolved in 270 ml of deionized water). The process of Example 1 is used except that drying is at 90° C. and that after total sorption of the strontium nitrate solution, the sample is calcined at 550° C. for 6 hours in static air. A second coating is provided from 83.8 ml of an aqueous solution of hydrochloroplatinic acid (0.046 g Pt/ml). Dipping and drying is as in Example 1. Finally, the sample is calcined at 550° C. for 6 hours in static air. The resulting comparative lean-NOx trap contains coatings of 2 wt. % Pt and 6 wt. % Sr, the percentages being based on the alumina washcoat. Previous results indicate that this corresponds to the optimal Sr loading.

EXAMPLE 3

(Comparative Barium/Platinum Trap)

A lean-NOx trap similar to that of Example 2 is prepared except that barium is used instead of strontium. 49.0 g of barium nitrate dissolved in 270 ml of deionized water are impregnated into an alumina washcoated cordierite monolith. Before impregnation, the alumina coated monolith weight 572.2 g and carried a 33 wt. % washcoat. Subsequently 83.8 ml of an aqueous solution of hydrochloroplatinic acid (0.046 g Pt/ml) is used. The resulting lean-NOx trap contains 2 wt. % Pt and 12 wt. % Ba. Previous results indicate that this corresponds to the optimal Ba loading.

Testing

Equal amounts of the lean-NOx traps catalyst from Examples 1, 2 and 3 are evaluated with time on stream (TOS) in a fixed-bed, flow reactor for removal of nitrogen oxides from simulated exhaust containing $SO_2$ at the traps' temperature of maximum NOx conversion as noted in FIG. 1. The simulated engine exhaust stream (total flow=3,000 ml/min., gas hourly space velocity (GHSV)=25,000h$^{-1}$) to which the samples are subjected contained: 13 ppm $C_3H_8$, 27 ppm $C_3H_6$, 2,400 ppm CO, 800 ppm $H_2$, 600 ppm NO, 1,400 ppm $O_2$, 10.0% $H_2O$, 10.0% $CO_2$, 20 ppm $SO_2$ and $N_2$ to balance. In addition, as part of the total feed flow, 1% CO and 6% $O_2$ are alternated every 60 seconds to simulate hybrid-mode engine operation. The test samples contained equal weights of platinum.

As shown in FIG. 1, the present invention trap of Example 1 (open triangles) had about double the average NOx conversion of the Example 2 (solid triangles) and 3 (crosses) comparative traps prepared using conventional formulations after several hours of exposure, even though the present invention trap initially had lower NOx efficiency. The Example 1 and 3 traps are tested for 24 hours while the Example 2 trap is tested for 9 hours. The expectation is that the Example 2 trap would continue to maintain its characteristics over longer time. The 2% Pt/20% $PW_{12}$ (Example 1) trap achieves about 44% NOx conversion efficiency after 9 hours of TOS while that of the 2% Pt/6% Sr trap only about 24% NOx conversion efficiency after 9 hours.

The decline in efficiency of the comparative examples trapping ability is typical of that seen with sulfur poisoning. As can be seen from the figure, the Example 1 present invention trap is not subject to sulfur poisoning. Further as noted from the figure, the higher efficiency of NOx conversion by the Example 1 present invention trap occurs at a lower operating temperature than for the comparative formulations. This feature of the present invention trap is extremely advantageous since it allows greater flexibility in positioning the trap in the exhaust gas system, i.e., more remote from the engine. Lower required operating temperatures for the trap also provide it with enhanced durability. While not wishing to be bound by theory, it is believed that the sulfur resistance of the present invention trap is due to the fact that NO is bound on the active acidic sites of the tungstophosphoric acid. While these sites have a strong propensity to adsorb NO, they have no affinity for the detrimental $SO_2$ poison. Neither the validity nor understanding of this theory is necessary for the practice of this invention.

EXAMPLE 4

A 2% Pt/$Al_2O_3$-washcoated monolith catalyst is prepared using the method described in Example 1. This catalyst is evaluated for 24 h with TOS using the identical feed gas mixture also described in Example 1. As can be seen in FIG. 2 (open squares), 24% NOx conversion efficiency is obtained using the Pt-only catalyst whereas 41% NOx conversion efficiency is achieved with the 2% Pt/20% $PW_{12}$ (Example 1) catalyst (open triangles). Thus, FIG. 2 illustrates that the catalyst with 20% $PW_{12}$ has superior $SO_2$ resistance when compared to a 2% Pt only catalyst.

EXAMPLE 5

A present invention 2% Pt/20% $PW_{12}$ catalyst embodiment is prepared as described in Example 1 and compared to a typical lean-NOx, 2% Pt/6% Sr, for $SO_2$ resistance. The catalysts are assessed with TOS for 24 h using the following feed gas: 13 ppm $C_3H_8$, 27 ppm $C_3H_6$, 2400 ppm CO, 800 ppm $H_2$, 600 ppm NO, 1400 ppm $O_2$, 10.0% $H_2O$, 10.0% $CO_2$, 9 ppm $SO_2$, and $N_2$ to balance. 1% CO and 6% $O_2$ are cycled every 60 seconds as part of the total feed gas flow. The 2% Pt/20% $PW_{12}$ has 48% NOx conversion efficiency, whereas the 2% Pt/6% Sr Lean-NOx trap obtains around 33% NOx conversion.

EXAMPLE 6

The 2% Pt/$PW_{12}$ catalysts with $PW_{12}$ loadings of 10%, 20%, 30% and 40% are prepared as described in Example 1.

Samples of these catalyst are evaluated using the feed gas of Example 3. The feed conditions correspond to a space velocity of 25,000 $hr^{-1}$. A temperature profile (150° C.–550° C.) is conducted to obtain the NOx conversion efficiency data for the catalysts as a function of temperature. At each temperature, steady state is achieved before the reported NOx conversion efficiencies are obtained. The catalysts with 10%, 20%, 30%, and 40% $PW_{12}$ obtained NOx conversion efficiencies of 44%, 60%, 56% and 58% at 250° C. and 64%, 62%, 56% and 57% at 300° C. respectively. This data suggests that the preferred $PW_{12}$ loading in the present invention is around 20%.

EXAMPLE 7

A 2% Pt/40% $PW_{12}$ lean-NOx trap catalyst is prepared as described in Example 1. This present invention catalyst is evaluated using the feed gas and procedure described in Example 4. After 24 h of time on stream a 44% NOx conversion is maintained.

EXAMPLE 8

(Comparative Tungstophosphoric Acid Only Catalyst Formulation)

A 20% $PW_{12}$ only catalyst is prepared according to the $PW_{12}$ coating procedure of Example 1. That is, no precious metal is included. The catalyst is evaluated using the procedure and feed gas described in Example 5. The NOx conversion efficiency is observed over the temperature range of 150° C.–550° C. and is shown to be less than 5% in FIG. 3 (open triangles). This data suggests that the additional presence of precious metal is critically necessary to achieve the NOx conversion objectives of this invention and provides a synergistic effect in combination with the tungstophosphoric acid.

EXAMPLE 9

Figure 4:
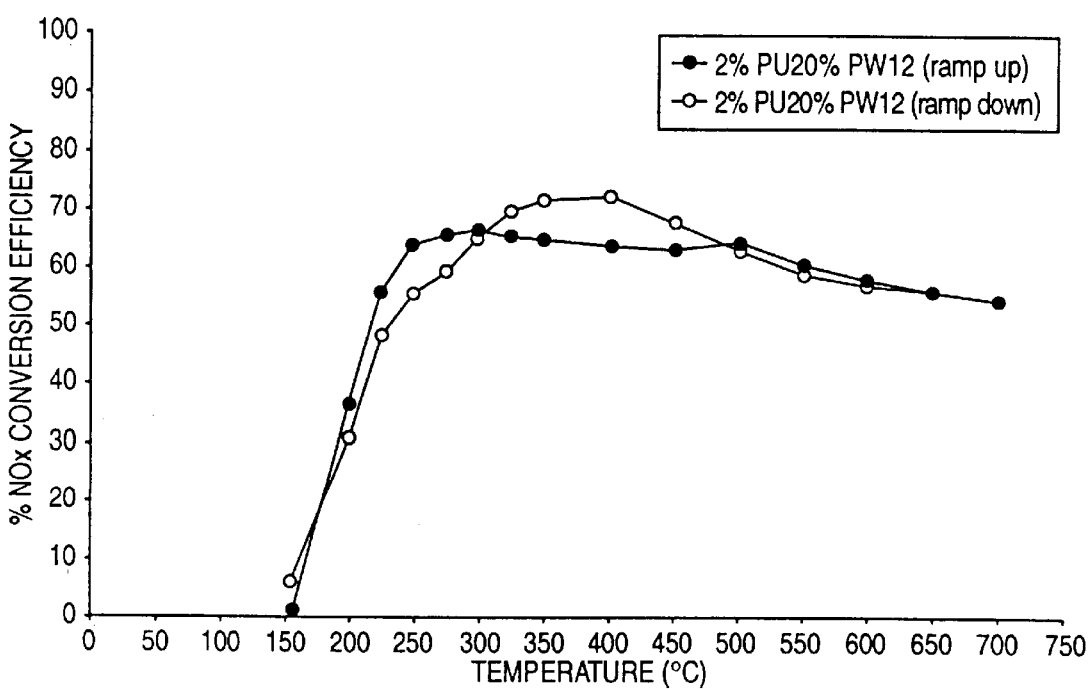
FIG. 4 is a graph showing the NOx conversion efficiency during temperature ramp up (solid circles) and down (open circles) of a present invention trap formulation.

A 2% Pt/20% $PW_{12}$ catalyst is prepared as described in Example 1. This catalyst is evaluated using the feed gas described in Example 5. A temperature profile is conducted from 150° C.–700° C. (ramp up) which is then followed by another temperature profile from 700° C.–150° C. (ramp down). It is shown in FIG. 4. As efficiency, while the second temperature profile obtains a 71% NOx conversion efficiency. This study illustrates that the catalyst has thermal stability to 700° C. under these experimental conditions as might be experienced during appellation in a vehicle exhaust system.

EXAMPLE 10

Figure 3:
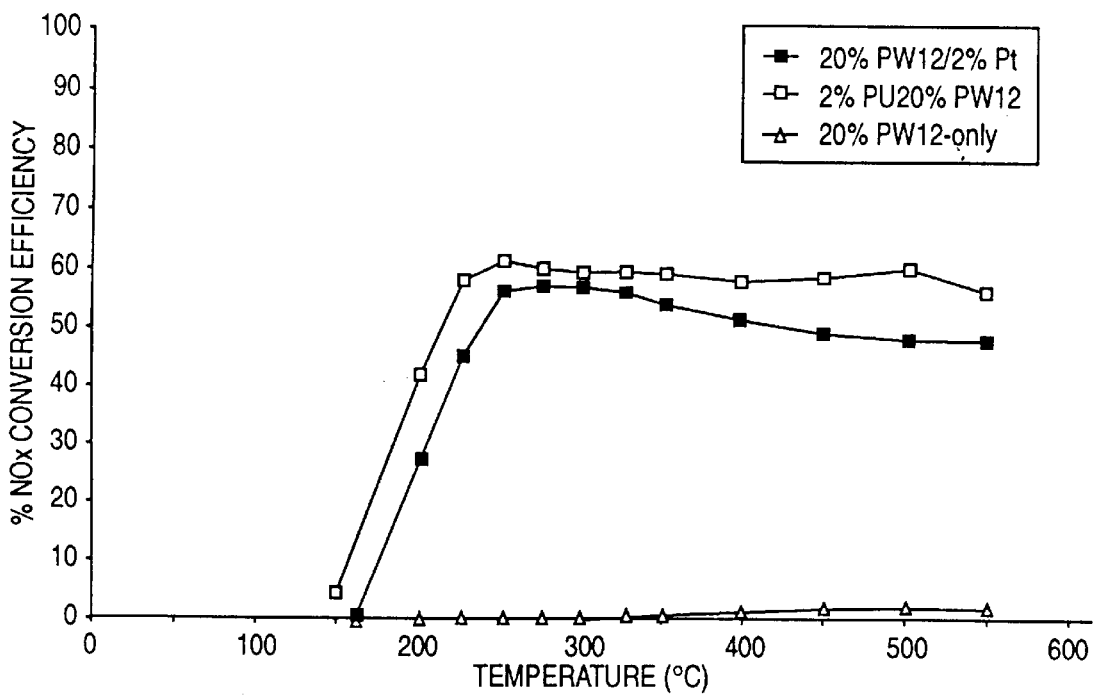
FIG. 3 is a graph showing comparisons of NOx conversion efficiency of a comparative formulation of only tungstophosphoric acid (open triangles) and two present invention embodiments of trap formulations loaded with platinum and tungstophosphoric acid, one (solid squares) including calcination at 500° C. between the loadings.

A Pt/$PW_{12}$ catalyst is prepared using sequential impregnation. The cordierite monolith is first impregnated with 2 wt. % Pt using the method described in Example 1. After all the Pt solution is sorbed, the monolith is calcined at 500° C. for 4 h. Then $PW_{12}$ is then applied as described in Example 1 resulting in a 20 wt-% loading. FIG. 3 depicts the NOx conversion efficiency as a function of temperature. As can be seen from FIG. 3 (solid squares), the NOx conversion efficiency for the sequentially impregnated 2%Pt/20%$PW_{12}$ catalyst, which has been calcined between impregnations, is lower over the entire temperature profile range of 150° C.–550° C. than the NOx conversion efficiency of another embodiment of the present invention (open squares) which does not include such calcination between loadings. After a 24 h TOS study using the feed gas described in Example 4, a NOx conversion efficiency of 35% is obtained with this sequentially impregnated and calcined catalyst. This data suggests that sequential impregnation using first platinum and then tungstophosphoric acid with calcining between impregnations results in lower overall NOx conversion efficiency than when calcining is not carried out between impregnations of these materials.

EXAMPLE 11

A 2% Pt/20% $PW_{12}$ catalyst is prepared according to the method described in Example 1, but after the final drying step the catalyst is calcined at 400° C. for 4 h. A temperature profile is conducted using the procedure and feed gas described in Example 5. This catalyst results in identical NOx conversion efficiency when compared to the 2% Pt/20% $PW_{12}$ catalyst prepared without the final calcination step.

EXAMPLE 12

A 0.25% Rh/1.8% Pt/20% $PW_{12}$ catalyst is prepared according to the procedure described in Example 1 using a rhodium solution of desired concentration. This catalyst is evaluated using the identical feed gas and test procedure described in Example 1. A 43% NOx conversion efficiency is obtained after 24 h of TOS at 325° C.

EXAMPLE 13

A 0.3% Pd/1.5% Pt/25% $PW_{12}$ catalyst is prepared using the method described in Example 1. A palladium nitrate solution of appropriate concentration is used to form the desired catalyst. This catalyst is evaluated for 24 h with TOS at 350° C. using the simulated feed gas mixture described in Example 1. The NOx conversion efficiency is 34%.

We claim:

1. An exhaust gas treatment system of a gasoline internal combustion engine, said system comprising a nitrogen oxide trap located in an exhaust gas passage of said engine and absorbing nitrogen oxides when an air/fuel ratio of exhaust gas flowing into said trap is lean, said nitrogen oxide trap releasing absorbed nitrogen oxides when an oxygen concentration in said exhaust gas flowing into said trap is lowered, said nitrogen oxide trap comprising:

a porous support comprising alumina; and materials, loaded on said support, consisting essentially of:
(i) 5 to 40 weight percent 12-tungstophosphoric acid and (ii) at least 0.25 weight percent precious metal selected from the group consisting of platinum, palladium, rhodium, and mixtures thereof, each amount of materials (i) and (ii) being individually based on the weight of said support.

2. The system according to claim 1 wherein said 12-tungstophosphoric acid is loaded on said support in an amount of 10 to 25 weight percent.

3. The system according to claim 2 wherein said 12-tungstophosphoric acid catalyst is loaded on said support in an amount of about 20 weight percent.

4. The system according to claim 1 wherein the precious metal is loaded on said support in an amount of 0.5 to 5 weight percent.

5. The system according to claim 1 wherein the precious metal comprises a mixture of platinum and rhodium and the weight ratio of platinum:rhodium is up to 50:1.

6. The system according to claim 1 wherein said precious metal consists of platinum.

7. The system according to claim 1 wherein said 12-tungstophosphoric acid and said precious metal are loaded one onto the top of the other.

8. The system according to claim 1 wherein said 12-tungstophosphoric acid and said precious metal materials are loaded as a mixture on said support.

9. The system according to claim 1 wherein said 12-tungstophosphoric acid and said precious metal are provided on said support as individual materials or their mixture from solutions thereof.

10. The system according to claim 1 which further comprises a three-way catalyst or a lean-burn catalyst positioned upstream of the nitrogen oxide trap.

11. The system according to claim 1 which further comprises a three-way catalyst positioned downstream of the nitrogen oxide trap.

12. A process for trapping nitrogen oxides from oxygen-rich exhaust gases generated during lean-burn operation of a gasoline internal combustion engine, said process comprising the steps of:

bringing said oxygen-rich exhaust gases, whose oxygen content is more than that required for oxidizing exhaust gas components to be oxidized therein, into contact with a nitrogen oxide trap comprising:
a porous support comprising alumina; and materials, loaded on said support, consisting essentially of:
(i) 5 to 40 weight percent 12-tungstophosphoric acid and (ii) at least 0.25 weight percent precious metal selected from the group consisting of platinum, palladium, rhodium, and mixtures thereof, each amount of materials (i) and (ii) being individually based on the weight of said support, said trap absorbing nitrogen oxides when an air/fuel ratio of the exhaust gas flowing through said trap is oxygen-rich and releasing absorbed nitrogen oxides when the oxygen concentration in said exhaust gas flowing through said trap is lowered.

13. The process according to claim 12 which further comprises the step of contacting said exhaust gases with a three-way or lean-burn catalyst positioned upstream of the nitrogen oxide trap.

14. The process according to claim 12 which further the step of contacting said exhaust gases with a three-way catalyst positioned downstream of the nitrogen oxide trap.

* * * * *